US010232858B2

(12) United States Patent
Odate (10) Patent No.: US 10,232,858 B2
(45) Date of Patent: Mar. 19, 2019

(54) CONTACT DETERMINATION PROCESSING APPARATUS (71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 104 days.

(21) Appl. No.: 15/342,379

(22) Filed: Nov. 3, 2016

(65) Prior Publication Data
US 2017/0129499 A1  May 11, 2017

(30) Foreign Application Priority Data

Nov. 6, 2015  (JP) ................. 2015-218413

(51) Int. Cl.
B60W 50/08 (2012.01)
B60K 37/06 (2006.01)
(Continued)

(52) U.S. Cl.
CPC ......... B60W 50/082 (2013.01); B60K 37/06 (2013.01); B60W 30/12 (2013.01); B62D 1/046 (2013.01);
(Continued)

(58) Field of Classification Search
CPC ... B60W 50/082; B60W 30/12; H05B 1/0236; H05B 3/34; H05B 3/46; B62D 1/06;
(Continued)

(56) References Cited

U.S. PATENT DOCUMENTS

2012/0313767 A1  12/2012 Sitarski
2015/0369633 A1* 12/2015 Karasawa ............ B62D 1/046
                                                324/686
2016/0303972 A1* 10/2016 Kuhne ................. B60W 30/12

FOREIGN PATENT DOCUMENTS

JP  2000-67396 A  3/2000
JP  2007-76491 A  3/2007
(Continued)

OTHER PUBLICATIONS

Office Action dated Aug. 22, 2017, issued in counterpart Japanese Application No. 2015-218413, witth English translation (8 pages).
(Continued)

Primary Examiner — Adam R Mott
(74) Attorney, Agent, or Firm — Westerman, Hattori, Daniels & Adrian, LLP (57) ABSTRACT A contact determination processing apparatus includes a contact sensor disposed in a steering wheel of and inside a vehicle. The contact sensor has an output that depends on a contact or non-contact state between the steering wheel and an occupant in the vehicle. The apparatus further includes a contact determination ECU that detects the contact state when the output of the contact sensor is greater than or equal to a predetermined threshold, and detects the non-contact state when the output is less than the predetermined threshold. In addition, the apparatus includes a temperature detection module that detects the ambient temperature of the steering wheel. The contact determination ECU includes a threshold changing section that changes the threshold based on a detection result of the temperature detection module.

7 Claims, 6 Drawing Sheets (51) Int. Cl.
  *B60W 30/12* (2006.01)
  *B62D 1/04* (2006.01)
  *B62D 1/06* (2006.01)
  *G01D 5/241* (2006.01)
  *H05B 3/46* (2006.01)
  *H05B 1/02* (2006.01)
  *H05B 3/34* (2006.01)

(52) U.S. Cl.
  CPC .............. *B62D 1/06* (2013.01); *G01D 5/2417* (2013.01); *H05B 1/0236* (2013.01); *H05B 3/34* (2013.01); *H05B 3/46* (2013.01); *B60K 2350/1036* (2013.01)

(58) Field of Classification Search
  CPC ...... B62D 1/046; G01D 5/2417; B60K 37/06; B60K 2350/1036
  See application file for complete search history.

(56) References Cited

FOREIGN PATENT DOCUMENTS

| | | |
|---|---|---|
| JP | 2012-48290 A | 3/2012 |
| JP | 2014-190712 A | 10/2014 |
| JP | 2014-190856 A | 10/2014 |
| JP | 2015-131544 A | 7/2015 |
| JP | 2015-149055 A | 8/2015 |
| WO | 2014/123222 A1 | 8/2014 |
| WO | 2015/070977 A1 | 5/2015 |

OTHER PUBLICATIONS

Office Action dated Jul. 24, 2018, issued in counterpart Chinese Application No. 201610890955.8, with English translation. (13 pages).

* cited by examiner

CONTACT DETERMINATION PROCESSING APPARATUS

CROSS REFERENCES TO RELATED APPLICATIONS

The present application claims priority under 35 U.S.C. § 119 to Japanese Patent Application No. 2015-218413, filed in Japan on Nov. 6, 2015, entitled "Contact Determination Processing Apparatus." The contents of this application are incorporated herein by reference in their entirety.

BACKGROUND

1. Field

The present disclosure relates to a contact determination processing apparatus that detects contact of an occupant in a vehicle with a predetermined member of and inside the vehicle.

2. Description of the Related Art

Japanese Unexamined Patent Application Publication No. 2014-190856 discloses a steering wheel release detecting apparatus (contact determination processing apparatus) that detects a release event in which an occupant releases his or her hold of a steering wheel of a vehicle. This contact determination processing apparatus includes a sensor electrode (contact sensor) disposed in the steering wheel of the vehicle, and detects a voltage (output) that depends on a capacitance of the sensor electrode. When the voltage exceeds a threshold, the apparatus determines that the occupant grips the steering wheel. When the voltage is less than or equal to the threshold, the apparatus determines that the occupant does not grip the steering wheel.

In such a kind of contact determination processing apparatus, an output of the contact sensor may vary depending on the ambient temperature of a detection target portion. Examples of the detection target portion include a steering wheel. For example, a low ambient temperature of the steering wheel may cause deformation of a laminated structure of the steering wheel (for example, formation of a gap between a shrinkable material and an unshrinkable material), resulting in a reduction in capacitance of the contact sensor. Unfortunately, this reduces the accuracy of contact detection by the contact sensor.

SUMMARY

It is desirable to provide a contact determination processing apparatus capable of accurately detecting contact with a member having temperature dependent characteristics in consideration of temperature change.

According to an aspect of the present disclosure, a contact determination processing apparatus includes a contact sensor disposed in a predetermined member of and inside a vehicle. The contact sensor has an output that depends on a contact or non-contact state between the predetermined member and an occupant in the vehicle. The apparatus further includes a contact determination unit (a contact determiner) that detects the contact state when the output of the contact sensor is greater than or equal to a predetermined threshold, and detects the non-contact state when the output of the contact sensor is less than the predetermined threshold. In addition, the apparatus includes a temperature detection unit (a temperature detector) that detects or estimates the temperature of the predetermined member or the ambient temperature thereof. The contact determination unit includes a threshold changing unit (a threshold changer or adjuster) that changes the threshold based on a result of detection or estimation by the temperature detection unit.

In this apparatus, if the predetermined member has temperature dependent characteristics, the threshold can be changed based on a temperature detected or estimated by the temperature detection unit. Consequently, the contact or non-contact state can be detected with reduced effects of the temperature. Thus, the contact determination processing apparatus can detect contact of the occupant with the predetermined member with significantly improved accuracy. A detection result indicating the contact or non-contact state can be useful to, for example, control the vehicle during travel of the vehicle.

In this aspect, the contact sensor may be a capacitance sensor having a capacitance that depends on the contact or non-contact state. When the result of the temperature detection unit is lower than a predetermined temperature, the threshold changing unit may set a threshold lower than the predetermined threshold by a predetermined value. The predetermined threshold is used when the result of the temperature detection unit is higher than or equal to the predetermined temperature.

In such a configuration, the threshold suitable for the capacitance sensor can be set. Thus, contact can be detected well using the capacitance sensor.

In this configuration, the predetermined member may include a heater that heats the predetermined member. When a predetermined time has elapsed after the heater is driven or when the temperature of the predetermined member reaches the predetermined temperature, the threshold changing unit may replace the lower threshold with the predetermined threshold.

As described above, since the threshold changing unit replaces the lower threshold with the predetermined threshold when the predetermined time has elapsed after the heater is driven or when the temperature of the predetermined member reaches the predetermined temperature, the threshold can be flexibly changed depending on situations where the heater is driven.

The contact sensor may be disposed in a steering wheel, serving as the predetermined member, used to steer the vehicle in an intended travel direction.

As described above, since the contact sensor is disposed in the steering wheel, the contact or non-contact state between the steering wheel and the occupant can be accurately detected.

Furthermore, when the output of the contact sensor is greater than or equal to a first threshold that is the predetermined threshold, the contact determination unit may determine that the occupant is in contact with the steering wheel. When the output of the contact sensor is greater than or equal to a second threshold higher than the first threshold, the contact determination unit may determine that the occupant grips the steering wheel. The threshold changing unit may change both the first threshold and the second threshold based on the result of the temperature detection unit.

In such a configuration, since the first threshold and the second threshold are used for contact detection, touch and grip of the occupant on the steering wheel can be distinguished from each other. In addition, since the threshold changing unit changes both the first and second thresholds based on the result of the temperature detection unit, false detection of a touch state and a grip state can be reduced.

In this configuration, the contact determination processing apparatus may further include a switching unit (a switcher) that switches a lane keeping control function of the vehicle between an available state and an unavailable state. The switching unit can keep the lane keeping control function in the available state when the contact determination unit determines that the occupant is in contact with the steering wheel.

In such a configuration, the contact determination processing apparatus can readily switch the lane keeping control function between the available state and the unavailable state based on a detection result of the contact determination unit. Specifically, while the occupant is in contact with the steering wheel, the lane keeping control function is kept in the available state. This reduces or eliminates a likelihood that a driver may unintentionally release his or her hold of the steering wheel during lane keeping control.

The contact determination processing apparatus may further include a driving-mode switching unit (a driving-mode switcher) that switches between an automatic driving mode in which steering, acceleration, and deceleration of the vehicle are automatically controlled and a manual driving mode in which the steering, acceleration, and deceleration are manually operated by the occupant. The mode switching unit may include a driving change determination unit (a driving mode determiner) that, when the contact determination unit determines that the occupant grips the steering wheel, determines that switching from the automatic driving mode to the manual driving mode is permitted.

As described above, since the driving change determination unit determines that switching from the automatic driving mode to the manual driving mode is permitted as long as the occupant grips the steering wheel, the mode switching unit can achieve stable transition from the automatic driving mode to the manual driving mode during travel of the vehicle.

In this case, when a condition for switching from the automatic driving mode to the manual driving mode is satisfied, the mode switching unit may prompt the occupant to grip the steering wheel.

In such a configuration, for example, when the vehicle determines to perform switching to the manual driving mode, the occupant is prompted to grip the steering wheel, thus causing the occupant to grip the steering wheel. Consequently, the contact determination unit determines that the steering wheel is gripped, thus achieving safe transition to the manual driving mode.

Furthermore, when the occupant selects the manual driving mode in the automatic driving mode, the mode switching unit may prompt the occupant to grip the steering wheel.

In such a configuration, since the occupant is prompted to grip the steering wheel when the occupant selects the manual driving mode, the mode can be switched to the manual driving mode not immediately, but after the occupant grips the steering wheel.

According to the present disclosure, the contact determination processing apparatus can accurately detect contact with a member having temperature dependent characteristics in consideration of temperature change. The word "unit" used in this application may mean a physical part or component of computer hardware or any device including a controller, a processor, a memory, etc., which is particularly configured to perform functions or steps as disclosed in the application.

DESCRIPTION OF THE PREFERRED EMBODIMENTS

A contact determination processing apparatus according to a preferred embodiment of the present disclosure will be described in detail with reference to the attached drawings.

Figure 1:
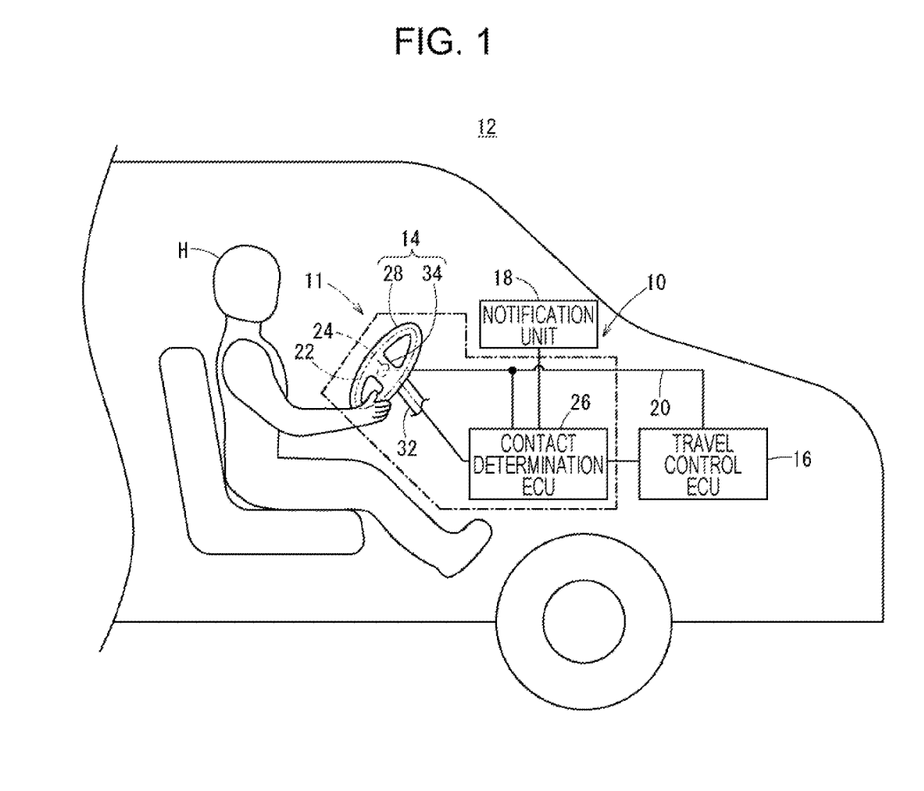
FIG. 1 is a schematic diagram of a vehicle including a contact determination processing apparatus according to an embodiment of the present disclosure.

A contact determination processing apparatus 10 is installed in a vehicle 12, such as a car, as illustrated in FIG. 1. The contact determination processing apparatus 10 is configured as a system that detects contact of an occupant H with a predetermined member of and inside the vehicle 12. In the following description, it is assumed that the predetermined member is a steering wheel (hereinafter, referred to as a "wheel 14"), serving as an operation member used to steer the vehicle 12 in an intended travel direction. The predetermined member of and inside the vehicle 12 is not limited to the wheel 14. Examples of the predetermined member may include various components of the vehicle, such as a shift lever, an assist grip, an armrest, a footrest, a seat, and a shoulder harness.

The contact determination processing apparatus 10 includes a detection main unit 11 that actually detects contact, a travel control ECU 16 that controls travel of the vehicle 12, and a notification unit 18 that notifies the occupant H of contact with the wheel 14 detected by the detection main unit 11. Examples of the occupant H include a driver and a passenger. The travel control ECU 16 and the notification unit 18 are connected to the detection main unit 11 by cables 20 for information communication. Examples of the notification unit 18 include an indicator, a touch panel, and a loudspeaker that generates notification sound or an audio output. Such a notification unit can be disposed on an instrument panel.

The detection main unit 11 includes a contact sensor 22 disposed in the wheel 14, a temperature sensor 24 similarly disposed in the wheel 14, and a contact determination ECU 26 disposed in the vehicle (for example, inside the instrument panel) and connected to the contact sensor 22 and the temperature sensor 24. The contact determination ECU 26 functions as a contact determination unit that controls an operation of detecting contact of the occupant H in a centralized manner.

The wheel 14 of the vehicle 12 includes a ring-shaped rim portion 28 to be gripped by the driver (occupant H) and a coupling portion 34 that couples radially inner parts of the rim portion 28 to a steering shaft 32. For example, the coupling portion 34 includes a horn button (not illustrated) disposed on its surface facing the driver and an air bag (not illustrated) received in its central part that coincides with the axis of the steering shaft 32. The wheel 14 is not limited to the steering wheel illustrated in the figures. Any other type of steering mechanism or control, such as a butterfly steering wheel, a joystick, or a button, may be used.

Figure 2:
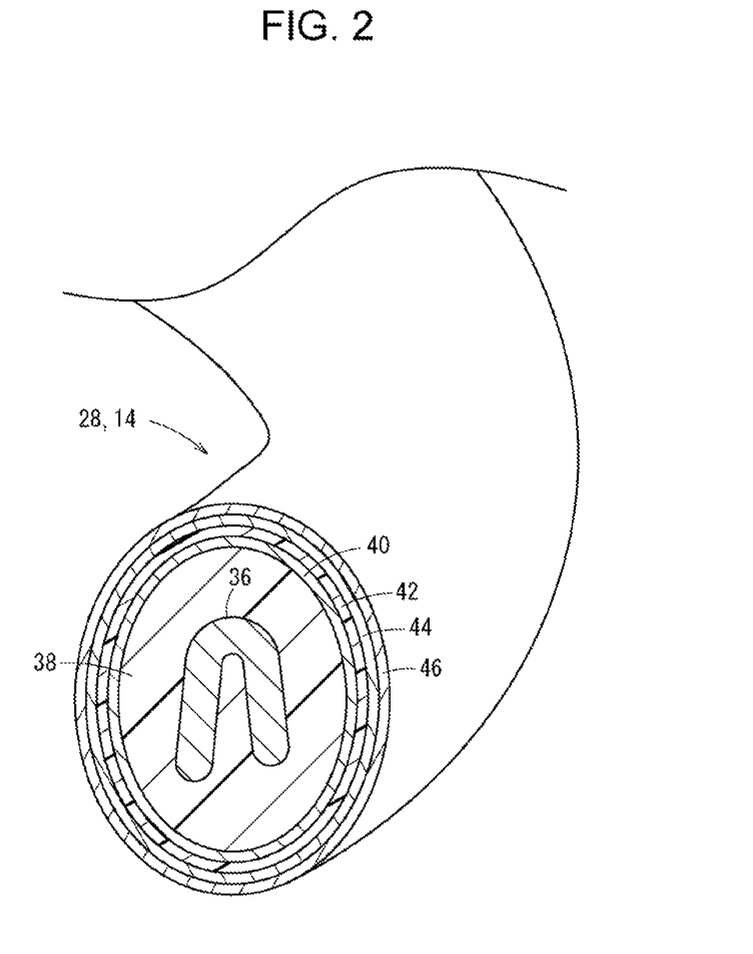
FIG. 2 is a cross-sectional perspective view of part of a steering wheel and illustrates a sectional structure of the steering wheel.

Referring to FIG. 2, the rim portion 28 of the wheel 14 has a laminated structure including a plurality of layers. Specifically, the rim portion 28 includes, in order from radially inner to outer, a metal core 36, a base layer 38, a heater layer 40, a shield layer 42, a sensor layer 44, and a cover layer 46.

The metal core 36 is made of metal (e.g., stainless steel) having high rigidity and is ring-shaped in plan view. The metal core 36 serves as a supporting structure of the rim portion 28 and is connected to the steering shaft 32 by a coupling member (not illustrated) included in the coupling portion 34. The metal core 36 is formed of a bent plate having a predetermined thickness and a U-shaped cross section, and accordingly has enhanced rigidity. The metal core 36 may have any cross-sectional shape. For example, the metal core 36 may be a ring-shaped pipe or a ring-shaped solid member.

The base layer 38 fully covers an outer surface of the metal core 36 such that the metal core 36 is covered with the base layer 38 having a sufficient thickness in cross-sectional view. The base layer 38 has a substantially circular or oblong cross-sectional shape. The base layer 38 defines the overall shape of the rim portion 28. The base layer 38 continuously extends over the ring-shaped metal core 36 in plan view such that the metal core 36 is circumferentially covered with the base layer 38. Preferably, the base layer 38 is made of a more flexible material than the metal core 36. Examples of such a material include resin, such as polyurethane.

The heater layer 40 covers an outer surface of the base layer 38 in cross-sectional view. The heater layer 40 is torus-shaped such that the base layer 38 is circumferentially covered with the heater layer 40 in plan view. When the heater layer 40 is driven by, for example, an operation by the occupant H, the heater layer 40 heats the rim portion 28 to improve an operation environment of the wheel 14 for the driver. The heater layer 40 can be made of a conductive material to be heated by power supply. The heater layer 40 is connected to a power source (not illustrated) by an electric wire disposed in the coupling portion 34. For example, the heater layer 40 is formed by wrapping a plate made of a conductive material around the base layer 38. For example, the heater layer 40 may be in the form of a coil or mesh formed by winding a wire rod made of a conductive material around the base layer 38. The heater layer 40 may cover the whole or part of the base layer 38 in the circumferential direction of the base layer 38.

The shield layer 42 covers an outer surface of the heater layer 40 in cross-sectional view. The shield layer 42 is torus-shaped such that heater layer 40 is circumferentially covered with the shield layer 42 in plan view. The shield layer 42 has a function of preventing the capacitance of the sensor layer 44 from being affected by a capacitance formed between the metal core 36 and the heater layer 40. An insulating layer (insulating material) may be disposed either between the shield layer 42 and the heater layer 40 or between the shield layer 42 and the sensor layer 44. Alternatively, the insulating layer may be disposed between the shield layer 42 and the heater layer 40 and may also be disposed between the shield layer 42 and the sensor layer 44. If the insulating layer is provided, the shield layer 42 can be allowed to function as an electrode and have a potential different from a voltage applied to the contact sensor 22. This can eliminate effects of the heater layer 40.

The sensor layer 44 covers an outer surface of the shield layer 42 in cross-sectional view. The sensor layer 44 is torus-shaped such that the shield layer 42 is circumferentially covered with the sensor layer 44 in plan view. The sensor layer 44 is made of a conductive material and serves as a detecting portion of the contact sensor 22. Examples of the conductive material include metal and conductive polymer. For example, such a material in the form of a wire is woven into the outer surface of the shield layer 42, thus forming the sensor layer 44.

The contact sensor 22 in the present embodiment is a capacitance sensor capable of detecting a capacitance in a contact state in which the occupant H (human body) is in contact with the wheel 14 and a capacitance in a non-contact state in which the occupant H is not in contact with the wheel 14. In this case, as illustrated in FIG. 3, the contact sensor 22 includes the above-described sensor layer 44, which is disposed in the rim portion 28 and actually detects contact, and a detection circuit 48 that is disposed in the coupling portion 34 or the instrument panel and is electrically connected to the sensor layer 44.

The detection circuit 48 applies a predetermined electric field to the sensor layer 44, thereby detecting a change in capacitance upon contact of the occupant H with the rim portion 28. For example, the detection circuit 48 includes an oscillator 48a and is electrically connected to the contact determination ECU 26 of the contact determination processing apparatus 10 and the ground (vehicle body). The detection circuit 48 transmits an output indicating a voltage that depends on the capacitance of the sensor layer 44 to the contact determination ECU 26.

Figure 3:
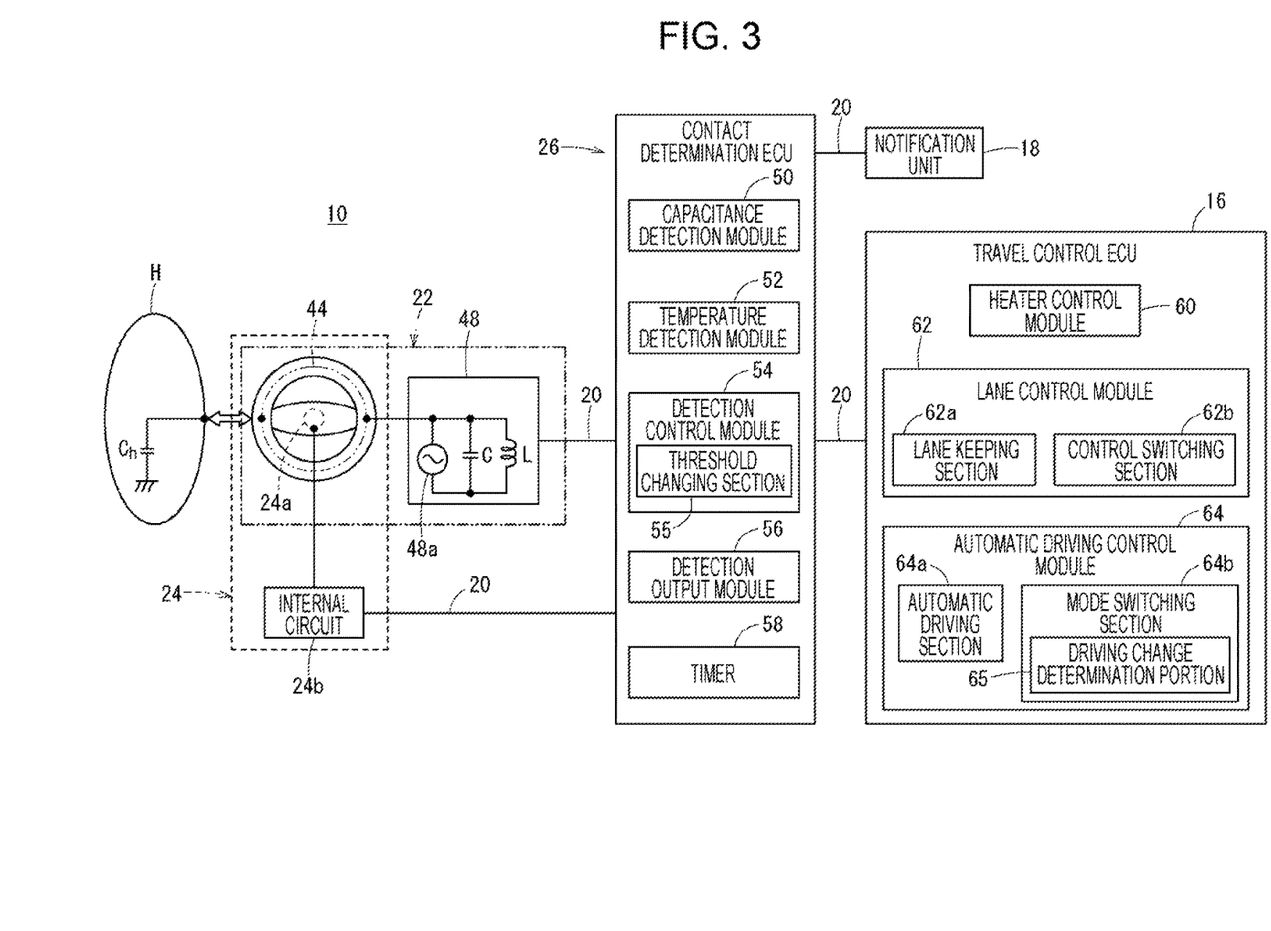
FIG. 3 is a functional block diagram illustrating an exemplary configuration of the contact determination processing apparatus for contact detection in the vehicle.

The contact sensor 22 (including the sensor layer 44 and the detection circuit 48) may include a resonant circuit including the oscillator 48a, an inductance L, and a capacitance C connected in parallel with one another (refer to FIG. 3). The capacitance C is an equivalent capacitance formed between the sensor layer 44 and the ground through the detection circuit 48. Assuming that the occupant H has a capacitance $C_h$ to the ground, a resonance frequency $f_0$ in the non-contact state in which the occupant H is not in contact with the rim portion 28 and a resonance frequency $f_1$ in a grip state in which the occupant H grips the rim portion 28 are given by Expressions (1) and (2)

$$f_0 = 1/2\pi(LC)^{1/2} \qquad (1)$$

$$f_1 = 1/2\pi(L(C+C_h))^{1/2} \qquad (2)$$

The contact sensor 22, therefore, has an output such that an output in the non-contact state in which the occupant H is not in contact with the rim portion 28 differs from an output in the contact state in which the occupant H is in contact with the rim portion 28. In addition, when the occupant H grips the rim portion 28, the area of contact between the occupant H and the rim portion 28 is greater than that in a state in which the occupant H is in light contact with the rim portion 28, thus increasing the capacitance $C_h$. Thus, the contact sensor 22 allows an output in a touch state in which the occupant H is in light contact with the rim portion 28 to differ from an output in the grip state in which the occupant H grips the rim portion 28.

Referring again to FIG. 2, the cover layer 46 covers an outer surface of the sensor layer 44 in cross-sectional view. The cover layer 46 is torus-shaped such that the sensor layer 44 is circumferentially covered with the cover layer 46 in plan view. It is desired that the cover layer 46 be made of a material that provides ease of grip and ease of operation to a driver. The cover layer 46 may be made of, for example, leather, resin, or wood. The cover layer 46 is covered with coating (not illustrated) to improve the durability and appearance of the wheel 14.

The configuration (shape and laminated structure) of the rim portion 28 is not limited to the above-described configuration. The rim portion 28 may have any other configuration. For example, the heater layer 40 may be optionally included in the rim portion 28. Furthermore, whether the shield layer 42 is included may be determined in consideration of effects of the electric field applied to the sensor layer 44. In addition, the sensor layer 44 may be formed by applying conductive coating to the surface of the cover layer 46. In this case, the rim portion 28 has a structure in which the sensor layer 44 serves as an outermost layer.

The coupling portion 34, which supports the inner parts of the rim portion 28, includes the temperature sensor 24 therein. The temperature sensor 24 is provided to detect the ambient temperature of the contact sensor 22.

The wheel 14 (or the rim portion 28) has temperature dependent characteristics: the capacitance C in FIG. 3 varies with the temperature of the wheel 14 or the ambient temperature thereof. The cover layer 46 made of, for example, leather shrinks with decreasing temperature, so that a small gap is formed between the cover layer 46 and the coating, which does not shrink, on the cover layer 46. This will cause a change in permittivity of the sensor layer 44, leading to a reduction in capacitance. Furthermore, the temperature dependent characteristics of a dielectric included in the contact sensor 22 may cause a change in capacitance.

Figure 4:
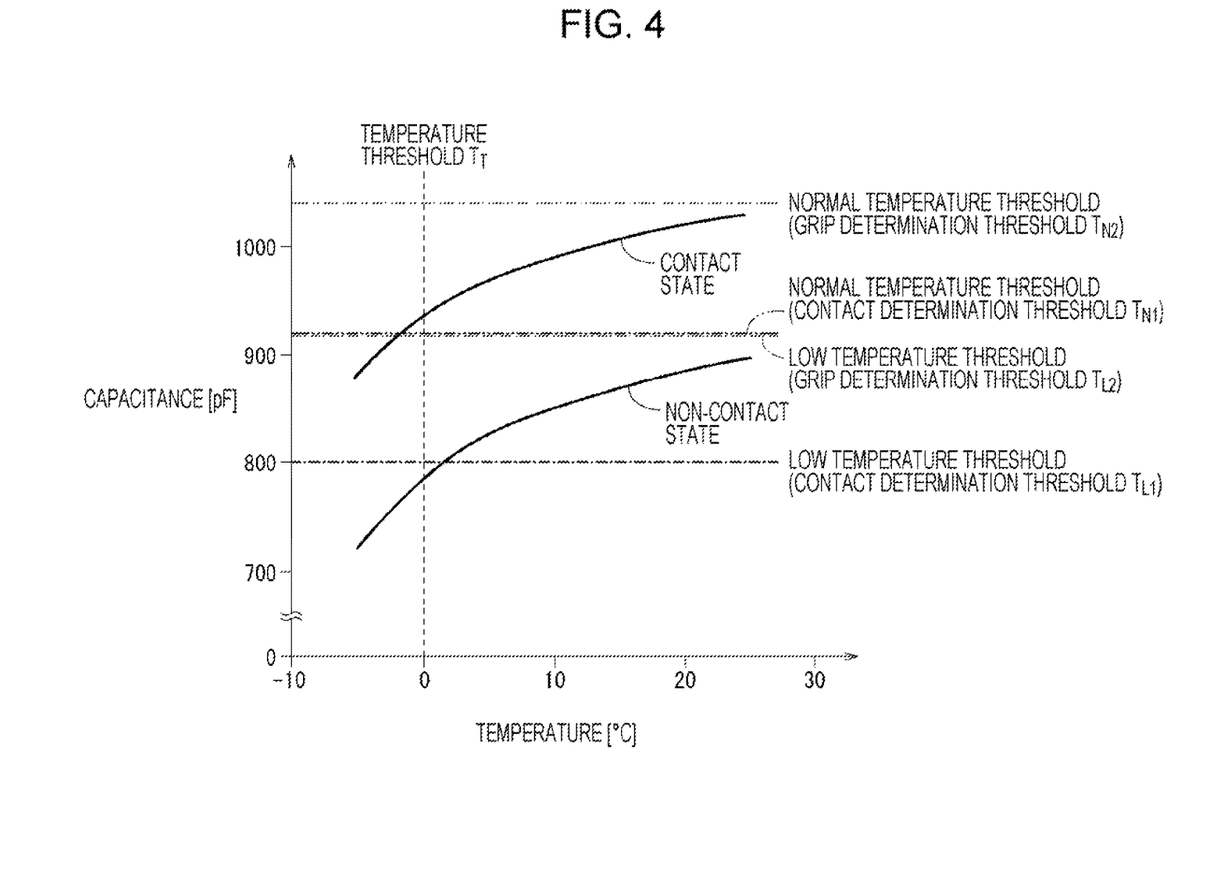
FIG. 4 is a graph illustrating the relationship between a temperature and a capacitance of a contact sensor in the steering wheel.

For this reason, in the wheel 14 in the present embodiment, a capacitance in the non-contact state detected by the contact sensor 22 gradually decreases with decreasing temperature as illustrated in a graph of FIG. 4. Although not illustrated, at temperatures at or above 25° C., the wheel 14 is hardly affected by mechanical action, such as deformation, and substantially the same capacitance is maintained.

On the other hand, a capacitance in the contact state detected by the contact sensor 22 also gradually decreases with decreasing temperature because the capacitance of the occupant H is added to a capacitance in the non-contact state (such that the capacitance in the contact state varies in substantially parallel to the capacitance in the non-contact state). Assuming that a threshold for contact detection is set based on a capacitance at a temperature of 25° C. (normal temperature), if the occupant H contacts the wheel 14 at a temperature lower than 0° C., a capacitance would not reach the threshold. The contact sensor 22 may fail to detect contact. For this reason, the contact determination processing apparatus 10 according to the present embodiment allows the temperature sensor 24 to detect the ambient temperature of the wheel 14 and uses the detected temperature for contact determination.

The temperature sensor 24 may have various configurations. For example, detecting part may include a thermistor 24a. Although not illustrated in FIG. 3, the temperature sensor 24 may be configured such that a fixed resistor, serving as an internal circuit 24b, is connected in series with the thermistor 24a and a detector, such as a microchip, measures a voltage of the thermistor 24a. The detector detects a divided voltage based on a change in resistance of the thermistor 24a, calculates a temperature based on the voltage division ratio, and outputs temperature information (signal) indicating the calculated temperature.

Preferably, temperature detecting part for direct temperature detection of the temperature sensor 24 is disposed in the vicinity of the contact sensor 22 in order to improve the accuracy of temperature measurement. In the present embodiment, the temperature sensor 24 is disposed at the middle of the coupling portion 34 in the longitudinal direction of the coupling portion 34 to detect an average temperature in the vicinity of the rim portion 28. A surface temperature of the rim portion 28 substantially depends on a temperature inside the vehicle. A thermometer (temperature sensor 24) may be installed to measure a temperature inside or outside the vehicle and the temperature information may be acquired from the thermometer. A thermometer previously installed in the vehicle 12 may be used. Furthermore, detecting part for direct temperature detection of the temperature sensor 24 may be embedded in the vicinity of the surface of the rim portion 28.

As illustrated in FIG. 3, the contact determination ECU 26 connected to the contact sensor 22 may be a known computer (including a microcontroller). The contact determination ECU 26 includes, although not illustrated, a processor, a storage module, and an input and output module. The processor executes a program stored in the storage module to achieve various functional components necessary for contact detection. More specifically, the contact determination ECU 26 includes a capacitance detection module 50, a temperature detection module 52, a detection control module 54, a detection output module 56, and a timer 58.

The capacitance detection module 50 acquires a voltage output from the contact sensor 22 continuously or at predetermined intervals, calculates a capacitance from the voltage, and stores capacitance information indicating the calculated capacitance to the storage module. The capacitance detection module 50 may allow storage of capacitance information indicating capacitances calculated for a predetermined time (e.g., a period between the time when the heater layer 40 is driven and the time when the surface temperature of the rim portion 28 is stabilized after increasing: several minutes to tens of minutes) to check a change in capacitance.

The temperature detection module 52 acquires temperature information from the temperature sensor 24 when an ignition switch is turned on, and stores the information to the storage module. The temperature detection module 52 determines whether the ambient temperature of the wheel 14 is in a low temperature state or a normal temperature state, and outputs a determination result to the detection control module 54. A boundary (temperature threshold $T_T$) between the low temperature state and the normal temperature state may be appropriately set based on the characteristics (e.g., the temperature dependent characteristics illustrated in FIG. 4) of the wheel 14. For example, the boundary may be set to 0° C. When the temperature information indicates a temperature below 0° C., the temperature detection module 52 can determine that the ambient temperature of the wheel 14 is in the low temperature state. When the temperature information indicates a temperature at or above 0° C., the temperature detection module 52 can determine that the ambient temperature is in the normal temperature state.

The temperature detection module 52 may have a function of estimating the surface temperature of the rim portion 28 based on the temperature information acquired from the temperature sensor 24. For example, the temperature detection module 52 may calculate an estimated surface temperature of the rim portion 28 based on the temperature information from the temperature sensor 24 by using a map or a relational expression obtained in advance by experiment. In addition to detecting a temperature when the ignition switch is turned on, the temperature detection module 52 may continuously detect a temperature to continuously check transition from the low temperature state to the normal temperature state or transition from the normal temperature state to the low temperature state in real time.

The detection control module 54 determines, based on a change in capacitance detected by the contact sensor 22, whether the occupant H is not in contact with the wheel 14, or detects the non-contact state or the contact state (the touch state or the grip state). The detection control module 54 includes a threshold changing section 55 that changes and sets a threshold for capacitance determination.

The threshold changing section 55 has two thresholds (capacitances) for the determination: a low temperature threshold $T_L$ for the low temperature state and a normal temperature threshold $T_N$ for the normal temperature state. The threshold changing section 55 selects one of the two thresholds based on a determination result, indicating that it is in the low temperature state or the normal temperature state, from the temperature detection module 52. The low temperature threshold $T_L$ and the normal temperature threshold $T_N$ are previously defined by, for example, a designer. The low temperature threshold $T_L$ is lower than the normal temperature threshold $T_N$ by a predetermined value (120 pF in FIG. 4). The threshold changing section 55 may have only the normal temperature threshold $T_N$. When it is determined that it is in the low temperature state, the threshold changing section 55 may set the low temperature threshold $T_L$ obtained by subtracting the predetermined value from the normal temperature threshold $T_N$. The threshold changing section 55 may be configured such that, when the contact determination processing apparatus 10 is driven, the threshold changing section 55 obtains an average capacitance in the low temperature state and an average capacitance in the normal temperature state, and automatically sets or corrects the low temperature threshold $T_L$ or the normal temperature threshold $T_N$.

After selecting the low temperature threshold $T_L$ or the normal temperature threshold $T_N$, the threshold changing section 55 sets the selected threshold as a contact determination threshold $T_{L1}$ or $T_{N1}$ (first threshold) and further sets a grip determination threshold $T_{L2}$ or $T_{N2}$ (second threshold) that is higher than the first threshold by a predetermined value. The contact determination thresholds $T_{L1}$ and $T_{N1}$ are thresholds used to detect the touch state in which the occupant H is in light contact with the wheel 14. The grip determination thresholds $T_{L2}$ and $T_{N2}$ are thresholds used to detect the grip state in which the occupant H firmly grips the wheel 14. For example, the grip determination threshold $T_{L2}$ is set as a value obtained by adding 120 pF to the contact determination threshold $T_{L1}$ and the grip determination threshold $T_{N2}$ is set as a value obtained by adding 120 pF to the contact determination threshold $T_{N1}$. The threshold changing section 55 may have two values (the contact determination threshold $T_{L1}$ and the grip determination threshold $T_{L2}$) as low temperature thresholds $T_L$ and two values (the contact determination threshold $T_{N1}$ and the grip determination threshold $T_{N2}$) as normal temperature thresholds $T_N$.

After the threshold changing section 55 sets the contact determination threshold $T_{L1}$ or $T_{N1}$ and the grip determination threshold $T_{L2}$ or $T_{N2}$, the detection control module 54 compares a capacitance continuously calculated by the capacitance detection module 50 with the set thresholds. If the capacitance is less than the contact determination threshold $T_{L1}$ or $T_{N1}$, the detection control module 54 determines that the occupant H is not in contact with the rim portion 28, or detects the non-contact state. If the capacitance is greater than or equal to the contact determination threshold $T_{L1}$ or $T_{N1}$ and is less than the grip determination threshold $T_{L2}$ or $T_{N2}$, the detection control module 54 detects the touch state. Furthermore, if the capacitance is greater than or equal to the grip determination threshold $T_{L2}$ or $T_{N2}$, the detection control module 54 detects the grip state.

Both the touch state and the grip state can be referred to as contact states because these states mean that the occupant H is in contact with the rim portion 28. The detection control module 54 may detect only one of the non-contact state and the contact state between the rim portion 28 and the occupant H. In this case, the contact determination threshold $T_{L1}$ or $T_{N1}$ (i.e., the low temperature threshold $T_L$ or the normal temperature threshold $T_N$) may be set and whether a capacitance exceeds the contact determination threshold $T_{L1}$ or $T_{N1}$ may be monitored. When detecting the non-contact state or the contact state (the touch state or the grip state), the detection control module 54 outputs information indicating a detection result to the detection output module 56.

The detection output module 56 allows the notification unit 18, based on the detection result from the detection control module 54, to notify of the non-contact state or the contact state (the touch state or the grip state). For the way of notification by the notification unit 18, preferably, notification of the touch state differs from that of the grip state (in display color, for example). Notification of the touch state and that of the grip state may be in the same manner and notification of the non-contact state can be simply distinguished from that of the contact state. The detection output module 56 further transmits information indicating the detection result to the travel control ECU 16.

The travel control ECU 16 is a computer that includes, although not illustrated, a processor, a storage module, and an input and output module, and has a function of controlling travel of the vehicle 12 in a centralized manner. In the present embodiment, the travel control ECU 16 includes a heater control module 60, a lane control module 62, and an automatic driving control module 64, which are achieved by executing a program through the processor. One or some or all of the heater control module 60, the lane control module 62, and the automatic driving control module 64 may be an ECU independent of the travel control ECU 16. The contact determination ECU 26 and the travel control ECU 16, i.e., these control units may be included in a single control circuit.

The heater control module 60 gives a power supply instruction (including specifying the amount of power supplied) for the heater layer 40 of the rim portion 28 to the power source (not illustrated), thereby heating the heater layer 40. For example, the heater control module 60 acquires temperature information from the temperature sensor 24 when the ignition switch is turned on. When a temperature indicated by the temperature information is lower than the predetermined temperature, the heater control module 60 drives the heater layer 40. The heater control module 60 may drive the heater layer 40 in response to the driver turning on an operation button.

The lane control module 62 has a lane keeping control function of guiding the vehicle 12 such that the vehicle 12 travels along a lane of a road during travel of the vehicle 12. The lane control module 62 includes a lane keeping section 62a that actually performs lane keeping control and a control switching section 62b that switches the lane keeping control between an available state and an unavailable (suspension) state. For example, the lane keeping section 62a acquires moving image data of a road from an image capture unit (not illustrated), identifies a lane of the road and the position and orientation of the vehicle 12 relative to the lane based on the moving image data, and performs processing of keeping the distance between the traveling vehicle 12 and the lane constant.

The control switching section 62b determines, based on information indicating a detection result of the contact determination ECU 26, whether to perform the lane keeping control. For example, during the lane keeping control, the control switching section 62b continues to perform the lane keeping control in accordance with a detection result indicating the contact state between the driver and the wheel 14, because as long as the driver is in contact with the wheel 14, the driver can immediately operate the wheel 14 if the wheel 14 is turned depending on lane situations.

The automatic driving control module 64 has a function of implementing an automatic driving mode in which steering, acceleration, and deceleration of the vehicle 12 are automatically controlled. The automatic driving control module 64 includes an automatic driving section 64a that actually controls the automatic driving mode and a mode switching section 64b that switches between the automatic driving mode and a manual driving mode, in which the steering, acceleration, and deceleration of the vehicle 12 are manually performed by the occupant H. In the automatic driving mode, the automatic driving section 64a performs the automatic driving control of the vehicle 12 in association with the lane keeping section 62a.

The mode switching section 64b performs switching from the automatic driving mode to the manual driving mode or switching from the manual driving mode to the automatic driving mode when a mode switching condition is satisfied. Examples of the mode switching condition include a case where the vehicle 12 (travel control ECU 16) determines to perform switching to the manual driving mode in the automatic driving mode and a case where the driver selects the manual driving mode by, for example, operating a mode selection switch. When the mode switching condition is satisfied, the mode switching section 64b allows, for example, the notification unit 18 to notify the driver of the need to grip the wheel 14 (or prompt the driver to grip the wheel 14). Consequently, the driver grips the wheel 14, so that transition from the automatic driving mode to the manual driving mode is performed with safety.

The mode switching section 64b includes a driving change determination portion 65 that determines, based on a detection result of the contact determination ECU 26, whether the driving mode can be changed. For example, the driving change determination portion 65 determines, based on a detection result indicating the grip state, that switching from the automatic driving mode to the manual driving mode is permitted, and changes the driving mode to the manual driving mode. On the other hand, if the grip state is not detected, the automatic driving control module 64 continues the automatic driving mode or performs, for example, processing of stopping the vehicle 12 after a lapse of a predetermined time.

The contact determination processing apparatus 10 according to the present embodiment and the vehicle 12 including this apparatus are fundamentally configured as described above. A process of contact detection will now be described.

The contact determination processing apparatus 10 is activated when the occupant H in the vehicle 12 turns on the ignition switch. The travel control ECU 16 is also activated in response to the turn-on of the ignition switch. The heater control module 60 acquires temperature information from the temperature sensor 24 upon activation. If the temperature information indicates a temperature lower than the predetermined temperature (e.g., 10° C.), the heater control module 60 drives the heater layer 40. On the other hand, if the temperature information indicates a temperature higher than or equal to the predetermined temperature, the heater control module 60 allows the heater layer 40 to be in an off state. When the heater layer 40 is driven, the timer 58 of the contact determination ECU 26 starts to measure time.

Figure 5:
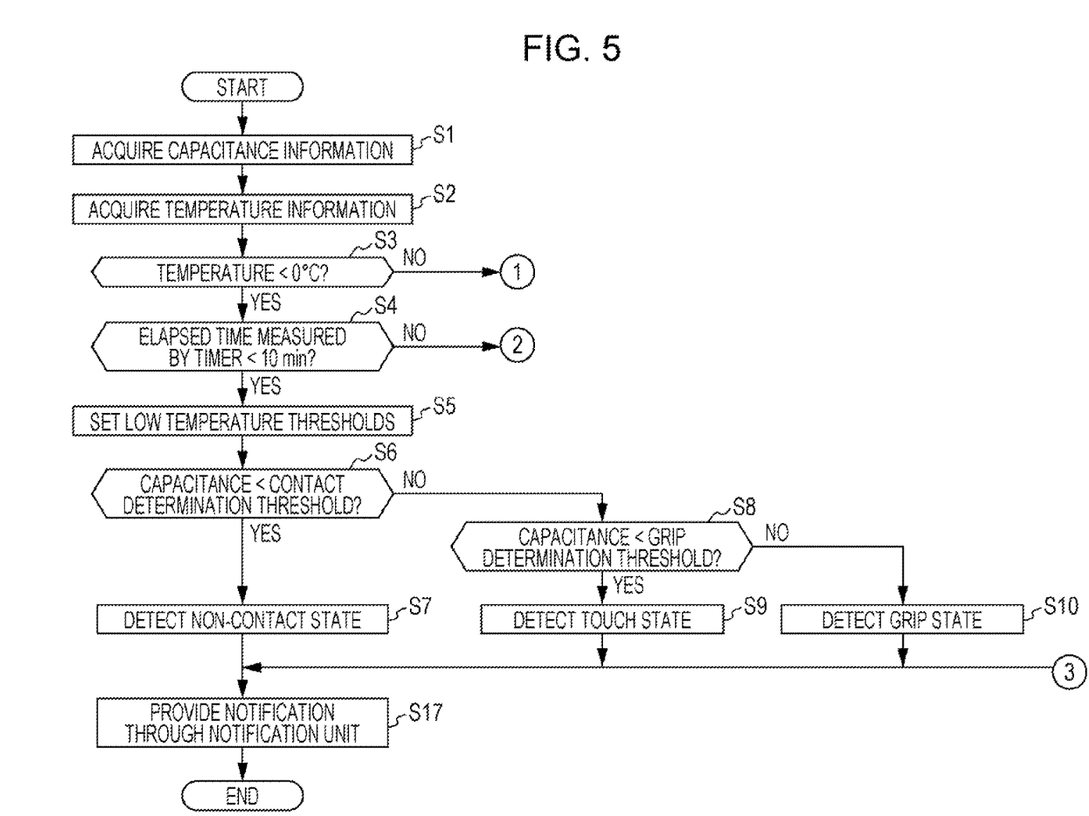
FIG. 5 is a first flowchart illustrating an exemplary process performed by a contact determination electronic control unit (ECU).

Referring to FIG. 5, upon activation, the capacitance detection module 50 of the contact determination ECU 26 receives an output from the contact sensor 22, calculates a capacitance, and stores capacitance information indicating the calculated capacitance (step S1). In addition, the temperature detection module 52 of the contact determination ECU 26 acquires temperature information from the temperature sensor 24 (step S2).

The contact determination ECU 26 (temperature detection module 52) determines based on the acquired temperature information whether the ambient temperature of the wheel 14 is below or at or above 0° C. that is the temperature threshold $T_T$ (step S3). If the temperature is below 0° C., the process proceeds to step S4. If the temperature is at or above 0° C., the process proceeds to step S11 (refer to FIG. 6).

In step S4, the contact determination ECU 26 monitors whether the elapsed time measured by the timer 58 exceeds the predetermined time (e.g., 10 min). In the case where the threshold changing section 55 selects the low temperature thresholds $T_L$, the heater layer 40 is driven. The ambient temperature of the wheel 14 will rise after a lapse of the predetermined time. If the measured elapsed time does not exceed the predetermined time, the process proceeds to step S5. The low temperature thresholds $T_L$ are set and processing of contact detection based on the low temperature thresholds $T_L$ is performed. After a lapse of the predetermined time, the process proceeds to step S11 (refer to FIG. 6). Processing of contact detection based on the normal temperature thresholds $T_N$ is performed.

In contact detection, the detection control module 54 compares the capacitance indicated by the capacitance information with the set low temperature thresholds $T_L$ (the contact determination threshold $T_{L1}$, the grip determination threshold $T_{L2}$) to determine whether the occupant H is in contact with the rim portion 28. For example, the detection control module 54 determines whether the capacitance is less than the contact determination threshold $T_{L1}$ (step S6). If the capacitance is less than the contact determination threshold $T_{L1}$, the detection control module 54 detects the non-contact state (step S7). If the capacitance is greater than or equal to the contact determination threshold $T_{L1}$, the detection control module 54 determines whether the capacitance is less than the grip determination threshold $T_{L2}$ (step S8). If the capacitance is less than the grip determination threshold $T_{L2}$, the detection control module 54 detects the touch state (step S9). If the capacitance is greater than or equal to the grip determination threshold $T_{L2}$, the detection control module 54 detects the grip state (step S10).

Figure 6:
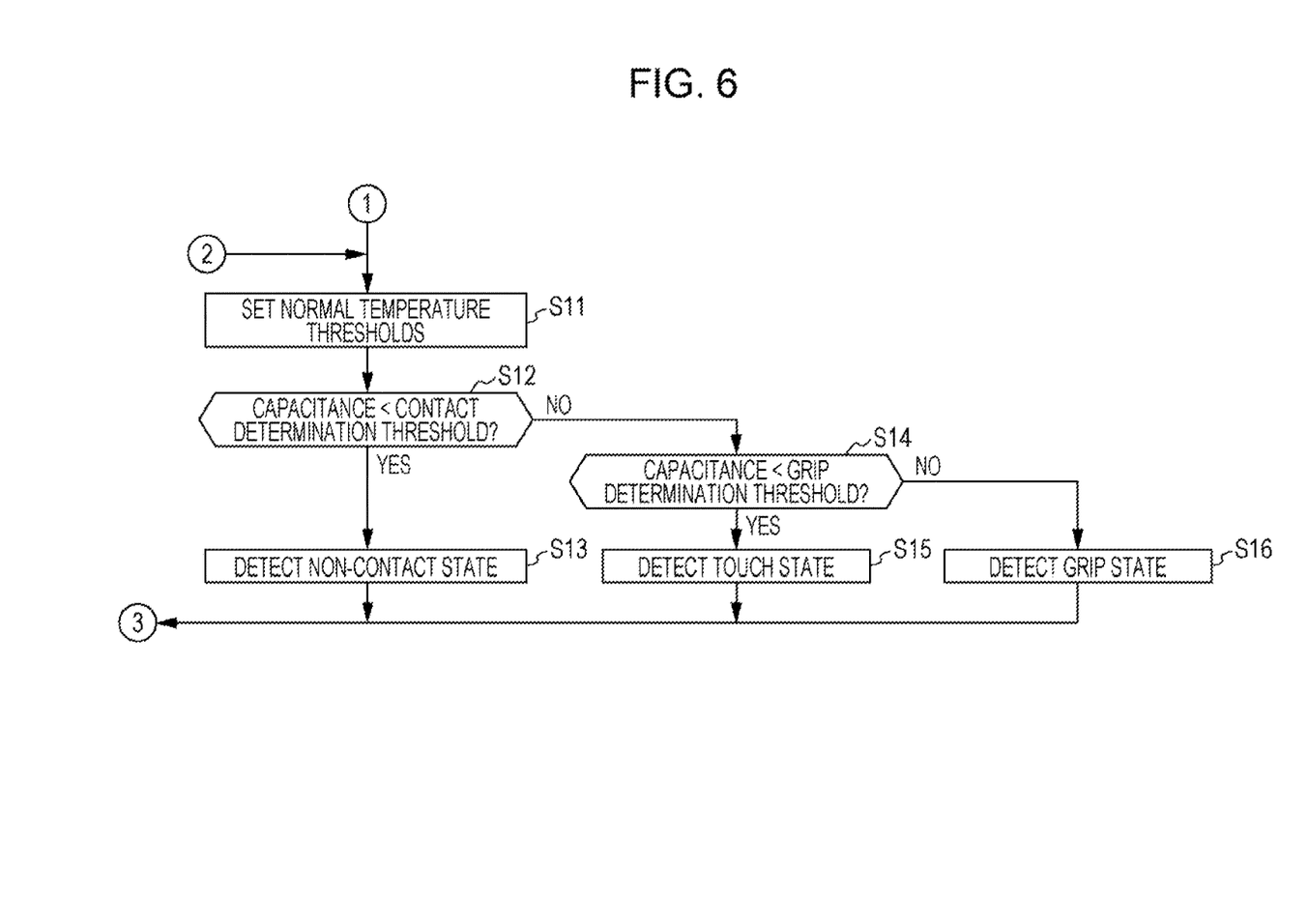
FIG. 6 is a second flowchart following the first flowchart of FIG. 5.

Referring to FIG. 6, in step S11, the threshold changing section 55 sets the normal temperature thresholds $T_N$ (the contact determination threshold $T_{N1}$, the grip determination threshold $T_{N2}$). In step S12 and the subsequent step, the detection control module 54 compares the capacitance indicated by the capacitance information with the set normal temperature thresholds $T_N$ to determine whether the occupant H is in contact with the rim portion 28. The determination can be performed in a manner similar to that based on the low temperature thresholds $T_L$. For example, the detection control module 54 determines whether the capacitance is less than the contact determination threshold $T_{N1}$ (step S12). If the capacitance is less than the contact determination threshold $T_{N1}$, the detection control module 54 detects the non-contact state (step S13). If the capacitance is greater than or equal to the contact determination threshold $T_{N1}$, the detection control module 54 determines whether the capacitance is less than the grip determination threshold $T_{N2}$ (step S14). If the capacitance is less than the grip determination threshold $T_{N2}$, the detection control module 54 detects the touch state (step S15). If the capacitance is greater than or equal to the grip determination threshold $T_{N2}$, the detection control module 54 detects the grip state (step S16).

Referring again to FIG. 5, the detection output section 56 allows the notification unit 18 based on the above-described detection result of the detection control module 54 to notify of the non-contact state or the contact state (the touch state or the grip state) (step S17). When the above-described process ends, the contact determination processing apparatus 10 returns to step S1 and repeats the process. Consequently, the non-contact state or the contact state between the rim portion 28 and the occupant H can be detected in real time during driving of the vehicle 12. If once the contact determination processing apparatus 10 acquires temperature information, the same thresholds can be continuously set in the subsequent processes. In the second and subsequent processes, steps S2 and S3 (acquisition of temperature information and temperature determination) may be omitted.

The lane control module 62 of the travel control ECU 16 can perform lane keeping control to allow the vehicle 12, based on an operation by the occupant H during travel of the vehicle 12, to travel along a lane. The lane control module 62 allows the control switching section 62b, based on a detection result indicating the contact state (the touch state or the grip state) from the contact determination ECU 26, to keep the lane keeping control in the available state. Consequently, the driver is inhibited from unintentionally releasing his or her hold of the steering wheel during the lane keeping control, thus increasing safety in the lane keeping control.

Furthermore, the lane control module 62 can cause the notification unit 18 based on a detection result indicating the non-contact state to prompt the driver to contact the wheel 14. For example, if the driver does not contact the wheel 14, the vehicle 12 can be stopped. On the other hand, if the driver contacts the wheel 14, the lane keeping control may be appropriately switched between continuance (the available state) and termination (the unavailable state). This further increases the safety during travel of the vehicle 12. The lane keeping control may be switched between the available state and the unavailable state based on a detection result indicating the grip state from the contact determination ECU 26.

Furthermore, the automatic driving control module 64 of the travel control ECU 16 implements the automatic driving mode to automatically control the steering, acceleration, and deceleration of the vehicle 12 during travel of the vehicle 12. For example, when the driver operates the mode selection button (not illustrated) for switching in the manual driving mode, the mode switching section 64b switches the mode to the automatic driving mode, thus providing the automatic driving mode through the automatic driving section 64a.

During automatic driving, the mode switching section 64b determines whether a mode switching condition for switching from the automatic driving mode to the manual driving mode is satisfied. For example, when a sharp turn in the road ahead of the vehicle 12 is detected by a navigation system or the like in the automatic driving mode, the mode switching section 64b determines that the mode switching condition for switching to the manual driving mode is satisfied. Furthermore, the mode switching section 64b can determine to perform switching between the automatic driving mode and the manual driving mode based on a driver's operation on the mode selection switch. When determining that the mode switching condition is satisfied in the automatic driving mode, the mode switching section 64b allows the notification unit 18 to provide notification in order to prompt the driver to grip the wheel 14. In other words, the driver is urged to grip the wheel 14.

When receiving detection information indicating the grip state from the contact determination ECU 26, the driving change determination portion 65 of the mode switching section 64b determines that switching from the automatic driving mode to the manual driving mode is permitted. Thus, the automatic driving control module 64 can switch the automatic driving mode to the manual driving mode, thus achieving stable transition from the automatic driving mode to the manual driving mode without immediate switching. In the non-contact state or the touch state, the mode switching section 64b determines that switching from the automatic driving mode to the manual driving mode is not permitted. In this case, for example, the automatic driving control module 64 may control the vehicle 12 such that the vehicle 12 can be stopped at an appropriate location after a lapse of a predetermined time. If the driver operates the mode selection switch for switching in the non-contact state or the touch state, the automatic driving control module 64 can continue the automatic driving mode.

As described above, the contact determination processing apparatus 10 according to the present embodiment and the vehicle 12 including the apparatus can change the thresholds based on a temperature of the wheel 14, which has the temperature dependent characteristics, detected by the temperature detection module 52. Consequently, the contact determination processing apparatus 10 can detect the contact state or the non-contact state while reducing effects of the temperature, thus significantly enhancing the accuracy of detection of contact of the occupant H with the wheel 14. The vehicle 12 can use a detection result indicating the contact state or the non-contact state for travel control.

Since the contact sensor 22 is a capacitance sensor, the contact determination ECU 26 can set the thresholds suitable for the capacitance sensor, thus achieving excellent contact detection using the capacitance sensor. The threshold changing section 55 replaces the low temperature thresholds $T_L$ with the normal temperature thresholds $T_N$ when the predetermined time has elapsed after the heater layer 40 is driven. Thus, the thresholds can be flexibly changed depending on situations where the heater layer 40 is driven.

Since the contact sensor 22 is disposed in the steering wheel (the wheel 14), the non-contact state or the contact state between the wheel 14 and the occupant H can be accurately detected. In addition, contact detection based on the contact determination threshold and the grip determination threshold enables distinction between the touch state and the grip state of the occupant H on the wheel 14. Since the threshold changing section 55 changes both the contact determination threshold and the grip determination threshold based on a detection result of the temperature detection module 52, false determinations of the touch state and the grip state can be reduced.

The contact determination processing apparatus 10 according to the present disclosure is not limited to the above-described embodiment, and various modifications can be made.

For example, in the above-described embodiment, the thresholds for temperature-based capacitance determination are classified into two sets, the low temperature thresholds and the normal temperature thresholds. In some embodiments, the thresholds are classified into three or more sets. For example, thresholds can be continuously varied so as to correspond to a capacitance that continuously varies with changing temperature as illustrated in FIG. 4. For example, a series of thresholds can be used that are somewhat higher than a thick line (indicating capacitances in the non-contact state) in FIG. 4 and that vary in parallel with the thick line. In this case, the contact determination ECU 26 can acquire both capacitance information and temperature information to detect a temperature in real time and set thresholds based on the detected temperature, thus detecting the touch state or the grip state more accurately.

In the above-described embodiment, when the contact determination ECU 26 determines that it is in the low temperature state, the contact determination ECU 26 measures time during which the heater layer 40 is heated (driven) and performs the processing based on the normal temperature thresholds after a lapse of the predetermined time. In some embodiments, the contact determination ECU 26 continuously acquires temperature information. When a temperature indicated by the temperature information reaches the predetermined temperature, the contact determination ECU 26 replaces the low temperature thresholds $T_L$ with the normal temperature thresholds $T_N$.

Furthermore, the contact sensor 22 may have any other configuration. In some embodiments, the contact sensor 22 is a pressure-sensitive capacitance sensor configured such that the rim portion 28 includes a pair of electrodes and a dielectric layer disposed between the electrodes and a capacitance varies in response to a change in thickness of the dielectric layer upon pressing by the occupant H. In some embodiments, the contact sensor 22 is an induction sensor that measures, as an impedance, magnetic loss caused by overcurrent in the wheel 14.

The present disclosure is not limited to the above-described embodiments. It should be understood that various changes and modifications can be made without departing from the sprit and scope of the present disclosure.

What is claimed is:

1. A contact determination processing apparatus comprising:
    a contact sensor having a single sensor region and disposed in a steering wheel of a vehicle inside the vehicle, the contact sensor generating via the single sensor region an output that varies depending on a contact or non-contact state between the steering wheel and an occupant in the vehicle;
    a contact determination unit configured to receive the output from the contact sensor, to determine that the steering wheel and the occupant are in the contact state when the output from the contact sensor is greater than or equal to a predetermined threshold, and to determine that the predetermined member and the occupant are in the non-contact state when the output from the contact sensor is less than the predetermined threshold; and
    a temperature detection unit configured to detect or estimate a temperature of the steering wheel or an ambient temperature of the steering wheel, wherein
    the contact determination unit comprises a threshold changing unit configured to change the threshold based on the temperature detected or estimated by the temperature detection unit,
    wherein when the output from the contact sensor is greater than or equal to a first predetermined threshold, the contact determination unit determines that the occupant is at least in contact with the steering wheel,
    wherein when the output from the contact sensor is greater than or equal to a second predetermined threshold higher than the first predetermined threshold, the contact determination unit determines that the occupant grips the steering wheel, and
    wherein the threshold changing unit changes both the first predetermined threshold and the second predetermined threshold based on the temperature detected or estimated by the temperature detection unit.

2. The apparatus according to claim 1,
    wherein the contact sensor is a capacitance sensor having a capacitance that varies depending on the contact or non-contact state, and
    wherein when the temperature detected or estimated by the temperature detection unit is lower than a predetermined temperature, the threshold changing unit changes the predetermined threshold to a threshold lower than the predetermined threshold by a predetermined value.

3. The apparatus according to claim 2,
    wherein the steering wheel is provided with a heater that heats the predetermined member, and
    wherein when a predetermined time has elapsed after the heater is driven or when the temperature of the steering wheel reaches the predetermined temperature, the threshold changing unit changes the lower threshold to the predetermined threshold.

4. The apparatus according to claim 1, further comprising:
    a switching unit that switches availability of a lane keeping control function of the vehicle between an available state in which the lane keeping control function is available and an unavailable state in which the lane keeping control function is not available,
    wherein the switching unit keeps the lane keeping control function in the available state when the contact determination unit determines that the occupant is in contact with the steering wheel.

5. The apparatus according to claim 1, further comprising:
    a driving-mode switching unit that switches between an automatic driving mode in which steering, acceleration, and deceleration of the vehicle are automatically controlled and a manual driving mode in which the steering, acceleration, and deceleration are manually operated by the occupant,
    wherein the mode switching unit comprises a driving mode change determination unit configured to permit the switching from the automatic driving mode to the manual driving mode when the contact determination unit determines that the occupant grips the steering wheel.

6. The apparatus according to claim 5, wherein when a predetermined condition for switching from the automatic driving mode to the manual driving mode is satisfied, the mode switching unit performs a predetermined operation to prompt the occupant to grip the steering wheel.

7. The apparatus according to claim 5, wherein when the occupant selects the manual driving mode in the automatic driving mode, the mode switching unit performs a predetermined operation to prompt the occupant to grip the steering wheel.

* * * * *